United States Patent
Fridman

(10) Patent No.: US 8,665,151 B2
(45) Date of Patent: Mar. 4, 2014

(54) L1/L2 GPS RECEIVER WITH PROGRAMMABLE LOGIC

(75) Inventor: Alexander E. Fridman, Moscow (RU)

(73) Assignee: Datagrid, Inc., Gainesville, FL (US)

( * ) Notice: Subject to any disclaimer, the term of this patent is extended or adjusted under 35 U.S.C. 154(b) by 632 days.

(21) Appl. No.: 13/512,542

(22) PCT Filed: Oct. 19, 2007

(86) PCT No.: PCT/US2007/022364
§ 371 (c)(1),
(2), (4) Date: May 29, 2012

(87) PCT Pub. No.: WO2008/085220
PCT Pub. Date: Jul. 17, 2008

(65) Prior Publication Data
US 2013/0002486 A1    Jan. 3, 2013

Related U.S. Application Data

(60) Provisional application No. 60/852,642, filed on Oct. 19, 2006.

(51) Int. Cl.
*G01S 19/32* (2010.01)
*G01S 19/37* (2010.01)

(52) U.S. Cl.
USPC ............................. 342/357.72; 342/357.77

(58) Field of Classification Search
USPC ............................. 342/357.72, 357.77
See application file for complete search history.

(56) References Cited

U.S. PATENT DOCUMENTS

| | | | |
|---|---|---|---|
| 5,134,407 A | 7/1992 | Lorenz et al. |
| 5,576,715 A | 11/1996 | Litton et al. |
| 5,663,733 A | 9/1997 | Lennen |
| 6,125,135 A | 9/2000 | Woo et al. |

FOREIGN PATENT DOCUMENTS

EP        0 924 532 A    6/1999

OTHER PUBLICATIONS

Office Action dated Aug. 19, 2009 issued in European Patent Application No. 07 872 189.1.
Office Action dated Jun. 30, 2010 issued in European Patent Application No. 07 872 189.1.
Ganguly S. "Real-time frequency software receiver" Position Location and Navigation Symposium, 2004. Plans 2004 Monterey, CA, USA Apr. 26-29, 2004, Piscataway, NJ, USA, IEEE, US, Apr. 26, 2004, pp. 366-374, XP010768897 ISBN: 978-0-7803-8416-3.
Office Action dated May 28, 2011 issued in Russian Patent Application No. 2009117768 (with translation).

*Primary Examiner* — Cassie Galt
(74) *Attorney, Agent, or Firm* — Oliff & Berridge, PLC

(57) ABSTRACT

A Global Positioning System (GPS) commercial receiver includes programmable logic that utilizes P-code modulated L1 and L2 GPS signals to derive estimates of in-phase and quadrature-phase components of both L1 and L2 signals, a programmable processor that calculates pseudoranges and pseudo-Doppler phases, and derives navigation solutions. A resulting complex accumulated L2 signal comprises near-ML estimates of desired L2 amplitude and pseudo-Doppler phase.

8 Claims, 7 Drawing Sheets

L1/L2 GPS RECEIVER WITH PROGRAMMABLE LOGIC

BACKGROUND

This disclosure relates generally to global positioning system (GPS) satellite receivers, and more particularly, to an overall architecture thereof and to specific digital signal processing sections within such receivers.

GPS satellites transmit spread spectrum signals on L1 and L2 frequency bands at 154fo and 120fo respectively, where fo=10.23 MHz. Each of L1 signals is modulated by C/A code and P-code, which are unique for each satellite. Both codes are publicly known. Each of L2 signals is modulated by P-code only. Although both the C/A code and P-code sequences are known, each GPS satellite is provided with the capability of modulating its P-code with a secret signal generally referred to as W-code. This "anti-spoofing" (A/S) allows the GPS system to be used for military applications by preventing jamming signals based on known P-codes from being interpreted as actual GPS signals. The combination of the P-code and the W-code is typically referred to as the Y-code.

There are important advantages to obtaining access to both L1 and L2 signals. First, ionospheric refraction can be measured and removed by co-processing the L1 and L2 pseudo-range, which allows achieving higher accuracy in stand-alone applications. Second, for survey applications, there is a significant advantage with the use of carrier-phase measurements of both L1 and L2 signals in phase-differential systems. L2 carrier-phase measurements supplemental to those of L1 redouble the total number of observables, and make it possible to arrange so-called "wide lane" observables that significantly improve performance of phase ambiguity resolution.

However, existing systems and methods for handling L1 and L2 signal have disadvantages. In particular, for example, existing techniques of recovering L2 carrier phase from the Y-code are becoming obsolete as GPS systems evolve. For example, known receiver structures are unable to exploit the possibilities of the new, more robust L2c code which will become available to civilian users. Known receiver structures are typically difficult or impossible to adapt to new applications because they are implemented by application specific integrated circuits (ASICs). Further, such ASICs can be costly.

Additionally, known receiver structures typically consume power and other resources at a high level in order to process L1 and L2 signals in an acceptable manner. Accordingly, there is a need for a processing method and system that retains high quality while reducing hardware complexity.

SUMMARY

Embodiments of the present invention address the above-noted concerns. The embodiments may comprise a receiver for processing L1 and L2 signals, where the receiver is readily configurable to process other kinds of signals, such as the more robust L2c signal. To this end, the receiver may comprise programmable logic able to be configured and/or reconfigured by, for example, a configuration file in the form of electronic data, such as software or firmware. The programmable logic may receive the configuration file from a memory under the control a central processing unit (CPU), for example during power-up of the receiver. Because the receiver is easily reconfigurable via the electronic data of the configuration file, the inflexibility and cost of ASICs is avoided.

Further, the embodiments may implement an efficient method that retains high quality while allowing hardware complexity to be significantly reduced.

DETAILED DESCRIPTION OF EMBODIMENTS

Figure 1:
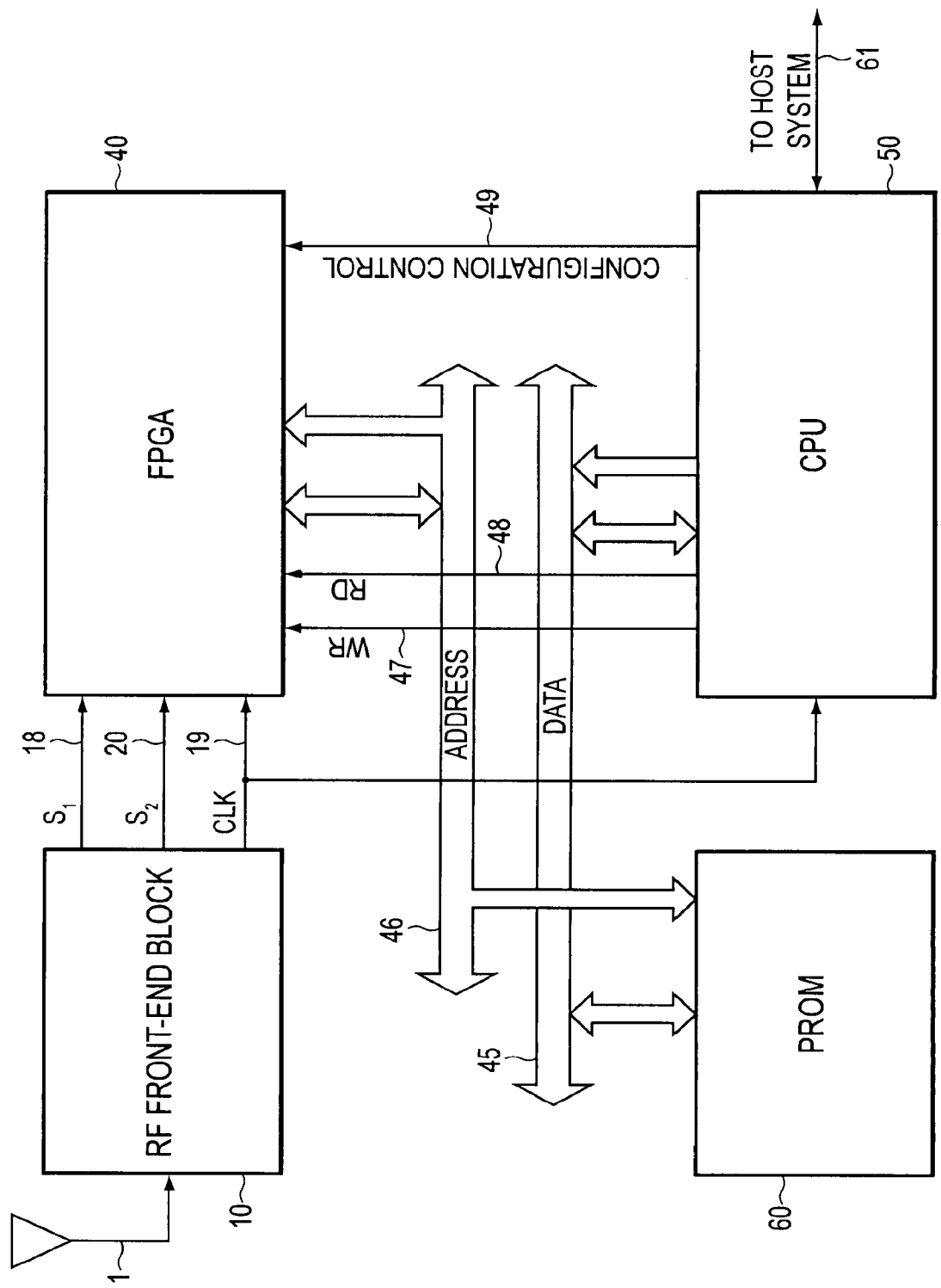
FIG. 1 shows a system of a dual frequency GPS receiver according to embodiments of the present invention.

As discussed above, because GPS systems are evolving, new signals are emerging at the L2 frequency range, and new signals are planned for L1. Consumers would benefit from a versatile receiver capable of processing signals of various structures.

Accordingly, embodiments of the present invention include a GPS receiver that may utilize programmable logic, such as a Field Programmable Gate Array (FPGA), to perform functions such as multi-channel digital processing of navigation signals, in contrast to the past approach of developing an application-specific integrated circuit (ASIC) for such functions. The programmable logic may be connected to a programmable central processing unit (CPU) by means of conventional buses and control signals, and be able to receive an operational configuration file from the CPU at each power-up initiation and be able to be reconfigured at any time. The configuration file may be stored in a programmable read-only memory (PROM). The CPU may be connected to the PROM by conventional buses and control signals. The CPU may read the configuration file from the PROM and write it into the programmable logic at power-up.

The receiver may further comprise a radio frequency front-end block for amplifying, filtering, down-converting and digitizing received L1/L2 navigation signals, a PROM, and CPU performing further data processing, navigation solution, and communicating to an external host system.

The advantages of such a receiver architecture include an ability to be adapted to existing Y-coded L2 signal as well as to the new L2c signal and other future L1 or L2 signals without any hardware modification, which is difficult or impossible with traditional ASIC-based receivers. According to embodiments of the present invention, a configuration file may simply be created for a new signal. The configuration file may be sent to an end user. The user can easily communicate the configuration file to the receiver's CPU which, in turn, may update PROM content correspondingly.

Another advantage a receiver architecture according to embodiments of the present invention is that there could be several configuration files in the receiver's PROM that are interchangeably and dynamically reloaded into the programmable logic (e.g., FPGA) in order to adapt to different situations during operation of the receiver.

Yet another advantage of such a receiver architecture is that it eliminates high cost of ASIC development.

A GPS receiver according to embodiments of the invention may be used, for example, in survey and high-precision navigation (kinematic) applications in which access to both L1 and L2 carrier signals is needed. Measuring the pseudorange and pseudo-Doppler phase of both signals makes it possible to compensate for ionospheric refraction of the GPS signals, and ensures fast phase ambiguity resolution in survey (kinematic) applications.

As noted previously, embodiments of the present invention may implement an efficient method that retains high quality while allowing hardware complexity to be significantly reduced. The method may perform operations associated with, for example, an approximation of a likelihood function as described below.

Complex input L1 and L2 signals can be represented in continuous time as:

$$S_1(t) = a_1 P(t) W(t) e^{j(\omega_1 t + \phi_1)} + \xi_1(t) \quad \text{complex L1 signal}$$

$$S_2(t) = a_2 P(t) W(t) e^{j(\omega_2 t + \phi_2)} + \xi_2(t) \quad \text{complex L2 signal} \quad (1)$$

where:
$a_1$, $a_2$, are real amplitudes of L1 and L2 signal correspondingly,
P(t) is a known P-code,
W(t) is an unknown W-code,
$\omega_1$, $\omega_2$ are pseudo-Doppler frequencies at L1 and L2 correspondingly, $\omega_2 = 60/77 \, \omega_1$,
$\phi_1$, $\phi_2$ are initial phases at L1 and L2 changing slowly due to ionosphere effects, and
$\xi_1$, $\xi_2$ are zero mean complex Gaussian noises.

The input signals are multiplied by corresponding replicas, and integrated over the W-bit interval. The complex replica signals are:

$$r_1(t) = P(t) e^{-j(\omega_1 t + \phi_2)} \quad \text{complex L1 replica}$$

$$r_2(t) = P(t) e^{-j(\omega_2 t + \psi)} \quad \text{complex L2 replica} \quad (2)$$

In (2) it is assumed that tracking on the L1 C/A code and phase allows for aligning the replica P-code with that of the input signal, to set the replica's frequencies equal to the signal frequencies, and to set the replica's L1 phase equal to the signal phase $\phi_1$. The latter condition cannot be implemented for L2, which is why L2 replica phase $\psi$ differs from $\phi_2$. The complex W-bit integrator outputs can be expressed from (1) and (2) as:

$$X_{1i} = \int_{f_i}^{f_i + T_w} S_1(t) r_1(t) dt = a_1 T_w w_i + \zeta_1 \quad (3)$$

$$X_{2i} = \int_{f_i}^{l_i + T_w} S_2(t) r_2(t) dt = a_2 T_w w_i e^{j\theta} + \zeta_2$$

where:
$\zeta_1$, $\zeta_2$ are zero mean complex Gaussian variables,
$\theta = \phi_2 - \psi$ is an unknown phase difference to be estimated,
$T_w$ is a duration of a W-bit interval, and
$w_i = \pm 1$ is an unknown W-bit value over the integration interval.

Denoting:

$$x_i = ReX_{1i};$$

$$y_i = ReX_{2i}$$

$$z_i = ImX_{2i}, \quad (4)$$

the joint probability density function on condition of $\theta$, $a_2$, and $w_i$ is:

$$p(x_i, y_i, z_i / \theta, a_2, w_i) = \quad (5)$$

$$C \exp\left\{-\frac{a_2^2}{2\sigma^2} + \frac{w_i}{\sigma^2}(a_1 x_i + a_2 y_i \cos\theta + a_2 z_i \sin\theta)\right\}$$

Assuming that the W-code is statistically bit-by-bit independent, and the probabilities of +1 and −1 are 0.5 each yields the following unconditioned (by $w_1$) probability density function:

$$p(x_i, y_i, z_i / \theta, a_2) = C_1 \cosh\left(\frac{a_1 x_i + a_2 y_i \cos\theta + a_2 z_i \sin\theta}{\sigma^2}\right) \cdot \exp\left\{-\frac{a_2^2}{2\sigma^2}\right\} \quad (6)$$

From (6), a logarithm of a likelihood function for the i-th W-bit interval follows as:

$$L_i(\theta, a_2) = \ln p(x_i, y_i, z_i / \theta, a_2) = \quad (7)$$

$$\ln C_1 + \ln \cosh\left(\frac{a_1 x_i + a_2 y_i \cos\theta + a_2 z_i \sin\theta}{\sigma^2}\right) - \frac{a_2^2}{2\sigma^2},$$

and for a whole estimation period including m W-bit intervals:

$$L(\theta, a_2) = \sum_{i=1}^{m} L_1(\theta, a_2) = \quad (8)$$

$$m \ln C_1 + \sum_{i=1}^{m} \ln \cosh\left(\frac{a_1 x_i + a_2 y_i \cos\theta + a_2 z_i \sin\theta}{\sigma^2}\right) - m \frac{a_2^2}{2\sigma^2}.$$

Figure 2:
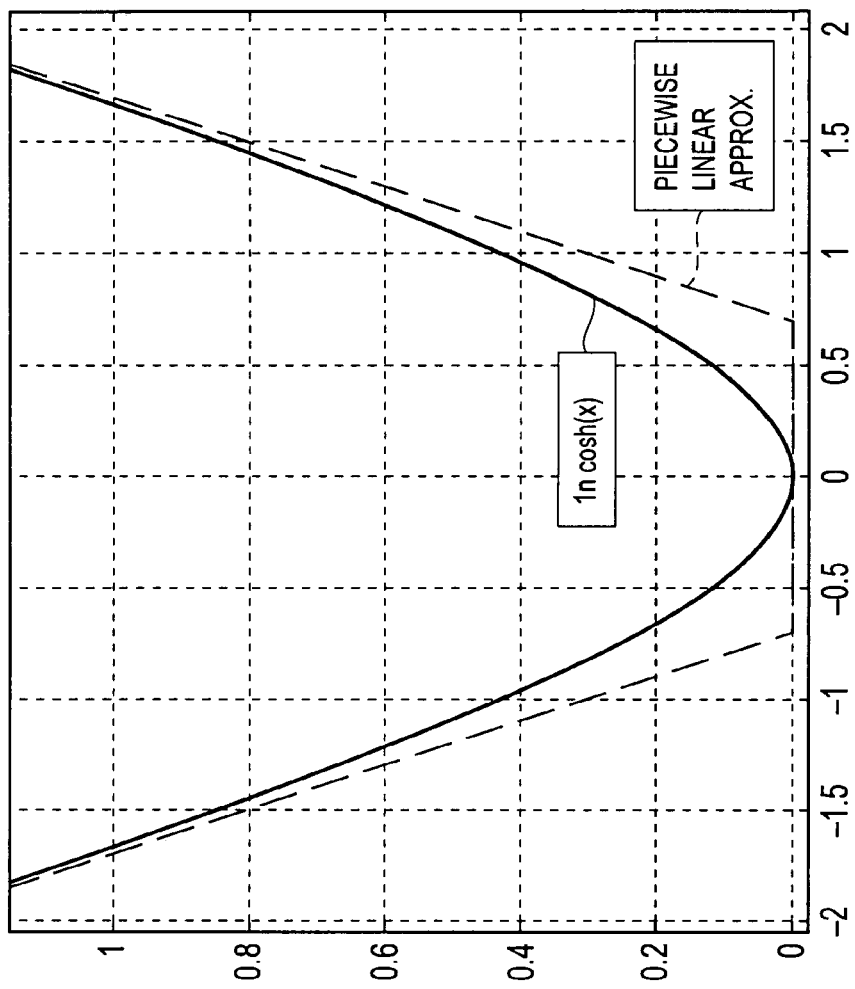
FIG. 2 shows a piece-wise approximation of the Ln cos h( ) function according to embodiments of the present invention.

In an operation absent from known techniques, the method of approximation uses a piecewise-linear approximation of the ln cos h( ) function. Turning to FIG. 2, there is shown ln cos h( ) function and its approximation, represented as:

$$\ln \cosh(u) \approx \begin{cases} u - 0.69 & \text{if } u > 0.69 \\ 0 & \text{if } |u| \leq 0.69 \\ -u - 0.69 & \text{if } u < -0.69 \end{cases} \quad (9)$$

It follows from (8), (9):

$$L(\theta, a_2) \approx \quad (10)$$

$$m \ln C_1 - 0.69 m_1 + \sum_{i=1}^{m} \frac{a_1 \bar{x}_i}{\sigma^2} + \sum_{i=1}^{m} \frac{a_2 \bar{y}_i \cos\theta + a_2 z_i \sin\theta}{\sigma^2} - m \frac{a_2^2}{2\sigma^2}.$$

-continued where:

$$\bar{x}_i = x_i, \bar{y}_i = y_i, \bar{z}_i = z_i, \quad \text{if } \frac{a_1 x_i + a_2 y_i \cos\theta + a_2 z_i \sin\theta}{\sigma^2} > 0.69 \quad (11)$$

$$\bar{x}_i = 0, \bar{y}_i = 0, \bar{z}_i = 0, \quad \text{if } \left|\frac{a_1 x_i + a_2 y_i \cos\theta + a_2 z_i \sin\theta}{\sigma^2}\right| \leq 0.69,$$

$$\bar{x}_i = -x_i, \bar{y}_i = -y_i, \bar{z}_i = -z_i, \quad \text{if } \frac{a_1 x_i + a_2 y_i \cos\theta + a_2 z_i \sin\theta}{\sigma^2} < 0.69$$

and $m_1$ is number of items with non-zero $\bar{x}_i$.

The maximum likelihood estimate of $\theta$ follows from (10):

$$\theta_{ML} = \arctan\left(\frac{\sum_{i=1}^{m} \bar{z}_i}{\sum_{i=1}^{m} \bar{y}_i}\right) \quad (12)$$

$$a_{2ML} = \frac{1}{m}\sqrt{\left(\sum_{i=1}^{m} \bar{y}_i\right)^2 + \left(\sum_{i=1}^{m} \bar{z}_i\right)^2}$$

In a steady-state tracking mode the value of $\theta$ is close to zero, so (11) becomes:

$$\bar{x}_i = x_i, \bar{y}_i = y_i, \bar{z}_i = z_i, \text{ if } a_1 x_i + a_2 y_i > 0.69\sigma^2$$

$$\bar{x}_i = 0, \bar{y}_i = 0, \bar{z}_i = 0, \text{ if } |a_1 x_i + a_2 y_i| \leq 0.69\sigma^2$$

$$\bar{x}_i = -x_i, \bar{y}_i = -y_i, \bar{z}_i = -z_i, \text{ if } a_1 x_i + a_2 y_i < 0.69\sigma^2 \quad (13)$$

On the other hand, in the initialization mode the value of $\theta$ is fully unknown, so better results are achieved if no L2 data included into eq. (11), i.e.:

$$\bar{x}_i = x_i, \bar{y}_i = y\bar{z}_i = z_i, \text{ if } a_1 x_i > 0.69\sigma^2$$

$$\bar{x}_i = 0, \bar{y}_i = 0\bar{z}_i = 0, \text{ if } |a_1 x_i| \leq 0.69\sigma^2$$

$$\bar{x}_i = -x_i, \bar{y}_i = -y\bar{z}_i = z_i, \text{ if } a_1 x_i < 0.69\sigma^2 \quad (14)$$

One advantage of expression (12), which may be characterized as an "estimator," is that it is a direct estimator, and does not require a gradient or closed loop system for implementation.

Another advantage of the estimator (12) is that it does not include any multiplication operation during accumulation of sums in the numerator and denominator of (12).

Referring to FIG. 1, an embodiment of a system which may be included in a receiver according to embodiments of the invention is illustrated. In the system, a signal received from an antenna is initially applied via a transmission line, such as an RF cable 1, to a radio-frequency (RF) front-end block 10. The front-end block 10 may amplify, down-convert, filter and digitize L1 and L2 signal in the received signal. The RF front-end block 10 may, for example, be arranged so that its output signals on the lines 18 and 20 are of video frequency (VF) in order to alleviate further digital processing. The actual frequency of the signals at lines 18 and 20 may be a pseudo-Doppler frequency. The RF front-end block output signals $S_1$ and $S_2$ may be complex to prevent losing important data, so each of lines 18 and 20 may comprise two sub-lines for real and imaginary signal components.

Digital signal processing may be implemented in programmable logic, such as a field-programmable gate array (FPGA) 40, which receives complex L1 and L2 signals by the lines 18 and 20, performs multi-channel correlation processing, and provides correlation data to a central processing unit (CPU) 50. The CPU 50 may read the correlation data with the use of a data bus 45 before setting the address bus 46 to an address of a channel and an item of interest, and setting a read control signal at line 48 to an enable state.

The CPU 50 may perform post-correlation processing of data read from FPGA 40. The processing may include phase locked loop (PLL) and delay locked loop (DLL) operations, as well as generating control data to correlation channels of the FPGA such as code delay, pseudo-Doppler phase and frequency, as will be explained below in more detail. To send control data, the CPU 50 may put the data into the data bus 45, setting the address bus 46 to an address of a channel and item of interest, and setting the write control signal at the line 47 to enable state. CPU 50 may communicate with an external host system via communication line 61, sending measured position, velocity and timing data to the host, and receiving various control data from it for adaptation of the receiver's parameters to a user's requests.

A programmable read-only memory (PROM) 60 may contain executable code for CPU 50. At receiver power up, the CPU 50 may fetch bootstrap instructions from the PROM 60, and execute them so as to load the executable code into the CPU's internal random access memory (RAM) by means of the data bus 45 and address bus 46. After loading, the CPU 60 may start to execute instructions from its internal RAM.

Operations following receiver power up may include loading a configuration file to the FPGA 40. The FPGA configuration file may define functionality of each of the FPGA's configurable logic blocks (CLBs), and interconnections between them, in that way obtaining desired processing functionality of the whole of the FPGA schematics. The FPGA's configuration file may be stored in the PROM 60 along with CPU's executable code. The CPU 50 may read the FPGA's configuration file from the PROM 60 with the use of the data bus 45 and address bus 46, and write it to the FPGA 40 by means of the same buses 45 and 46. Supplementary signals may be applied to the FPGA 40 by the line 49 to control the process of loading of the configuration file.

The PROM 60 may be capable of storing several configuration files adapted to different operational conditions of the receiver. CPU 50 may choose one of them for loading at receiver power up in accordance to a user's preference, which may also be stored in the PROM 60. Additionally, the user may issue a command via communication line 61 to switch to a different FPGA configuration during normal operation of the receiver. In such an event, the CPU 50 may read a desired configuration file from the PROM 60, and load it to FPGA 40 the same way as was described above for power up mode. In this manner, a high degree and quickness of adaptability is achieved.

When the new L2c signal becomes available and a schematic design is ready for its processing, the corresponding configuration file may be loaded from the host system via communication line 61 to the CPU 50, which will write it into the PROM 60. Following this, the CPU may load a new configuration file at each receiver power up the same way as described above. In embodiments, a part of the correlation channels in the programmable logic (e.g., FPGA) may be configured to process the L2c signals, while another part may be configured to process old L2 signals. Accordingly, a receiver architecture according to embodiments of the present invention is ready for the new L2c signal, and will further be easily updated from time to time with L2c capability as more GPS satellites with L2c capability are launched to orbit.

Figure 3:
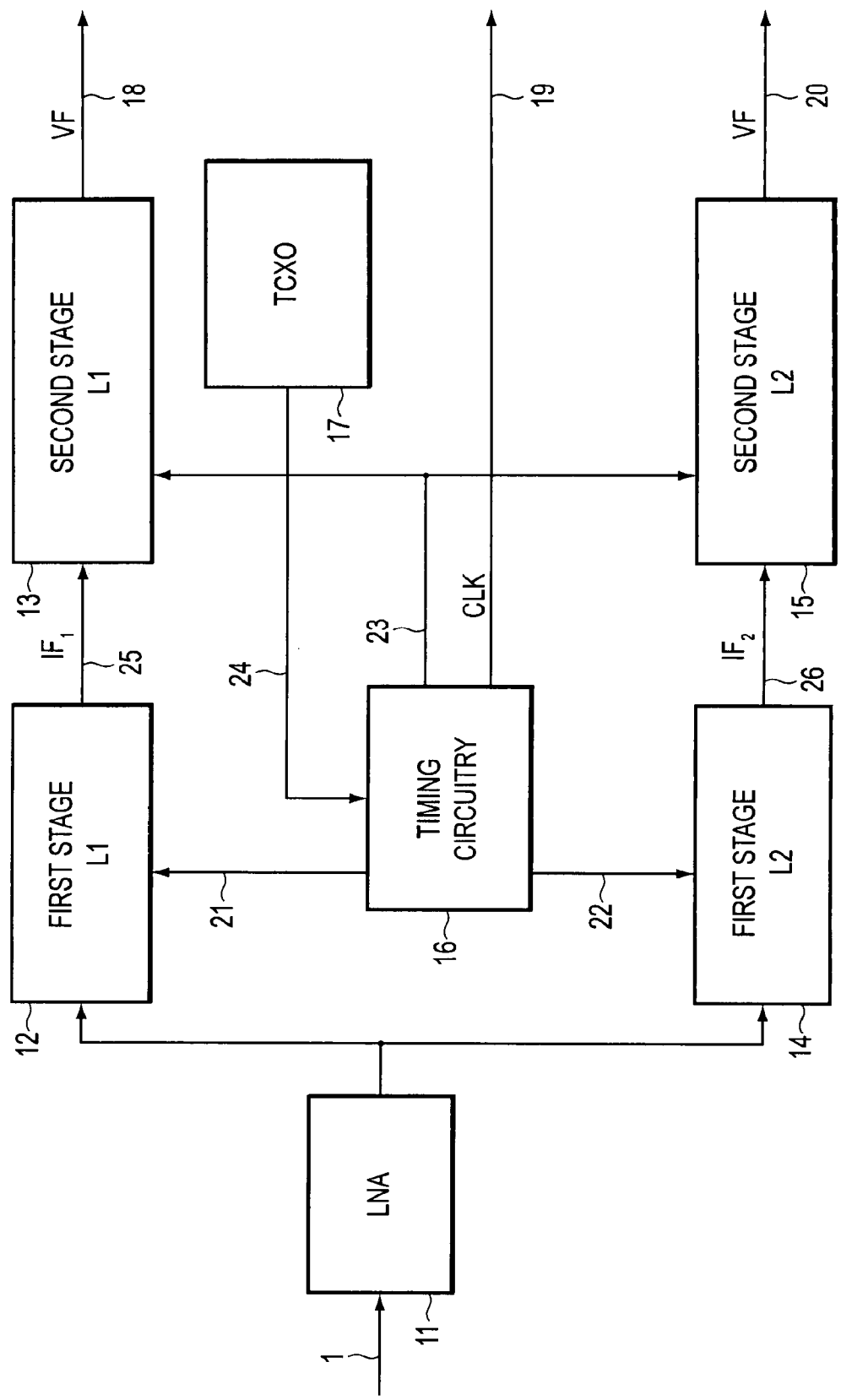
FIG. 3 shows an embodiment of a circuit configuration of the RF front-end block of the system of FIG. 1.

Turning now to FIG. 3, the RF Front-End Block 10 is depicted in more detail. The signals received by the antenna may be applied by the cable 1, which may be a high frequency transmission line, to a low noise amplifier 11, the output of which is applied to the inputs of L1 and L2 channels. The L1 channel may include first stage 12 and second stage 13 while L2 channel may include first stage 14 and second stage 15. In the first L1 stage 12 the signal may be filtered, amplified, and downconverted to an intermediate frequency $IF_1$ signal 25. Similarly, in the first L2 stage 14 the signal may be filtered, amplified, and downconverted to an intermediate frequency $IF_2$ signal 26. The $IF_1$ signal 25 may be further filtered, amplified, and downconverted to video frequency in-phase and quadrature-phase components, and digitized in the second stage block 13. The output 18 of block 13 may include two lines: a first line for a digital in-phase L1 signal, and a second line for a digital quadrature-phase L1 signal. Similarly, the $IF_2$ signal 26 may be further filtered, amplified, and downconverted to video frequency in-phase and quadrature-phase components, and digitized in the second stage block 15, having an output 20 which may include two lines: a first line for a digital in-phase L2 signal, and a second line for a digital quadrature-phase L2 signal. The circuitry of blocks 12-15 comprises amplifiers, mixers, filters, and analog-to-digital converters operating in a conventional manner to perform abovementioned signal transformations. In an exemplary embodiment, each of two lines of output 18 is a one-bit line, and each of two lines of output 20 is also a one-bit line, so analog-to-digital converters of the second stages 18 and 20 may be simple comparators with zero threshold.

A Temperature Compensated Crystal Oscillator (TXCO) 17 supplies a reference frequency on line 24, which is used in the timing circuitry 16 to generate local oscillator signals on the lines 21, 22, and 23, as well as a clock signal on line 19. To this end, the timing circuitry 16 comprises conventional frequency synthesizers. The output signal 19 is used for clocking all other blocks of the receiver.

Figure 4:
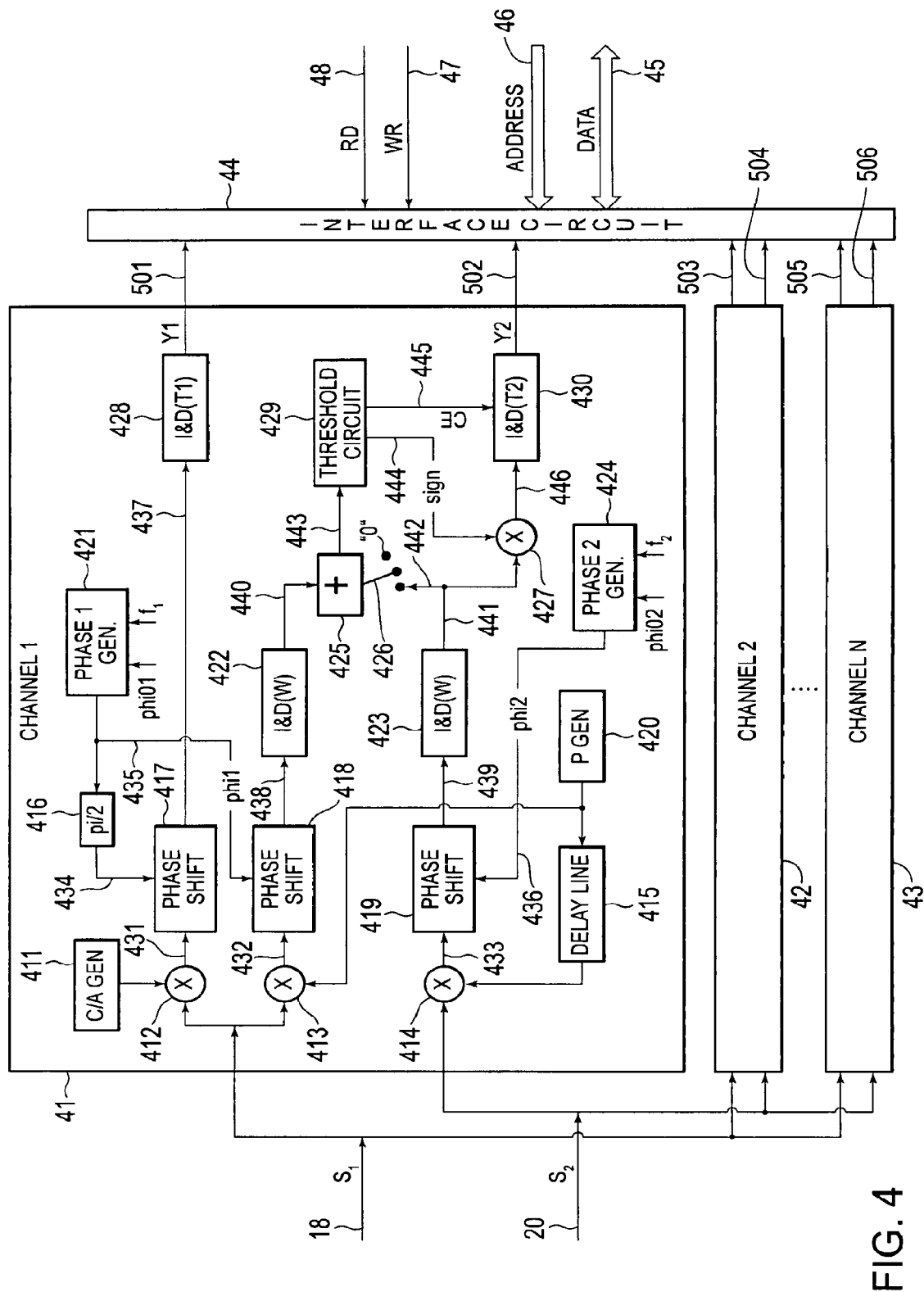
FIG. 4 is a block diagram of an embodiment of schematics implemented in the system of FIG. 1.

Turning to FIG. 4, the FPGA 40 schematics are shown. Complex input signals $S_1$ and $S_2$ may be supplied to a plurality of identical baseband processing channels 41-43, each of which may be associated with a separate satellite from which a signal is received. The number of baseband channels provided may be sufficient to ensure that a baseband channel is available for each received satellite signal. In an exemplary embodiment, signals from four or more satellites are utilized to make a determination of the desired parameter (e.g., position, velocity and time). Each of the baseband channels 41-43 may be capable of recognizing the digitized outputs from the RF Front-End Block 10 on lines 18, 20 corresponding to a particular satellite by decorrelating the $S_1$ and $S_2$ signals using locally generated replicas of the C/A and P codes unique to a given satellite.

As illustrated in FIG. 4, each baseband channel 41-43 may communicate $Y_1$ and $Y_2$ data derived from the digital $S_1$ and $S_2$ signals to the CPU 50 via interface circuitry 44, which may connect one of the lines 501-506 to the data bus 45 in accordance with a desired channel and its data item $Y_1$ or $Y_2$ as defined by the CPU 50 by setting a corresponding address on the address bus 46. The interface circuitry 44 may also be used to relay control data from the CPU 50 to the baseband channels 41-43. The CPU 50 may control satellite ID number, C/A code phase, P-code phase, pseudo-Doppler frequencies $f_1$ and $f_2$, and initial pseudo-Doppler phases phi01, phi02 in order to match generated L1 and L2 replicas to the received satellite signal. To this end, the CPU 50 may set the address bus 46 in accordance with a destination channel and control item, and put the control data to the data bus 45. By the control lines 47,48 the CPU may indicate read mode (RD) when it receives channel data $Y_1$ or $Y_2$, or may indicate write mode (WR) when it transfers control data to a channel.

As illustrated in FIG. 4, the complex signal $S_1$ may be mixed in the mixer 413 with a P-code replica generated by P-code generator 420 thereby providing a demodulated output 432. The structure and organization of the P-code generator 420 may be in conformity with "Interface Control Document ICD-GPS-200C," by Arine Research Corporation (1993), FIGS. 3.3...3.7, for example. Similarly, the complex signal $S_2$ may be mixed in the mixer 414 with the same P-code replica but delayed by a controllable delay line 415 thereby providing a demodulated output 433. The mixers 413, 414 may invert the signs of both in-phase and quadrature-phase components of $S_1$ or $S_2$, correspondingly, if current P-code or delayed P-code value is 1, and let them pass unchanged otherwise.

Each of the partially demodulated signals 432 and 433 may then be applied to respective phase shifters 418 and 419, which compensate pseudo-Doppler phases. To this end, an L1 phase generator 421 may generate a phase value phi1 in the line 435 in accordance with initial phase phi01 and frequency $f_1$, and an L2 phase generator 424 generates a phase value phi2 in the line 436 in accordance with initial phase phi02 and frequency $f_2$. The CPU 50, via the interface circuitry 44, may set the values of phi01 phi02, fi f2 before the start of current accumulation period $T_2$. The phase shifters 418 and 419 may virtually rotate vectors represented by complex $S_1$ and $S_2$ signals by the angle phi1 on the line 435, and phi2 on the line 436, correspondingly.

An in-phase component of the demodulated and Doppler-compensated L1 signal on the line 438 may be applied to accumulator 422 that integrates the signal over time period corresponding to W-bit duration. Simultaneously, both in-phase and quadrature-phase components of the demodulated and Doppler-compensated L2 signal on the line 439 may be applied to accumulators 423 that integrate the signals over time period corresponding to the same W-bit duration. The accumulated L1 in-phase component may be latched in circuitry or a line represented by 440 while both in-phase and quadrature-phase L2 components may be latched in circuitry or a line represented by 441.

Accumulated in-phase L2 component may then be separated from the circuit 441 to circuit 442, and applied to a weighted summator 425 through a controllable switch 426. Simultaneously, an accumulated in-phase L1 component in the circuit 440 may be applied to another input of the weighted summator 425. CPU 50 may close or open the switch 426 before the start of current accumulation period $T_2$ by a command that is routed by the interface circuitry 44 to the switch 426. The output signal of the weighted summator in circuitry or a line represented by 443 may be applied to a threshold circuit 429, which extracts the sign of the signal 443 into the line 444, and compares the magnitude of the signal in circuitry or a line 443 to a threshold. The CPU 50, via the interface circuitry 44, may set a threshold value before the start of current accumulation period $T_2$. If the signal magnitude exceeds the threshold, the circuit 429 may set its output 445 to 1, otherwise, it may set it to 0. This way conditions indicated in eq. (13) may be checked when the switch 426 is closed, and conditions indicated in eq. (14) may be checked when the switch 426 is open.

Accumulated complex L2 signal in circuitry or a line represented by 441 may also be mixed in a mixer 427 with the sign delivered by the line 444. The mixer 427 may simply invert the signs of both in-phase and quadrature-phase components of the complex signal in the circuit 441 if current sign value is 1, and let them pass unchanged otherwise. The mixer output in the circuit 446 may be applied to accumulator 430, which integrates the signal 446 over a time period ($T_2$). Then, the signal in the line 445 may be used as a clock enable (CE) signal so that the accumulator 430 adds its input in the circuit 446 to a previously accumulated value, only if the CE signal in the line 445 is 1. In this manner, a desired complex L2 signal Y2 may be developed in the line 502 in accordance with eq. (12).

As also indicated by FIG. 4, the complex signal $S_1$ may be mixed in the mixer 412 with a C/A code replica generated by C/A code generator 411, thereby providing a demodulated output in the circuit 431. The structure and organization of the C/A code generator 411 may be in conformity with "Interface Control Document ICD-GPS-200C". The mixer 412 may simply invert the signs of both in-phase and quadrature-phase components of $S_t$ if the current C/A code value is 1, and let them pass unchanged otherwise.

The C/A demodulated signal 431 may then be applied to a phase shifter 417, which compensates pseudo-Doppler phase. For this operation, the phase value phi1 in the line 435 generated by L1 phase generator 421 in accordance with initial phase phi01 and frequency $f_1$ may be shifted by $\pi/2$ in the phase shifter 416. The CPU 50, via the interface circuitry 44, may set the values of phi01 and $f_1$ before the start of a current accumulation period $T_1$. The phase shifter 417 may virtually rotate the vector represented by complex $S_1$ signal by the angle phi1=$\pi/2$ on the line 434. The phase shifter output in the circuit 437 may be applied to accumulator 428, which integrates the complex signal 437 over a time period ($T_1$). In this manner, the desired complex L1 signal Y1 may be developed in the line 501.

Figure 5:
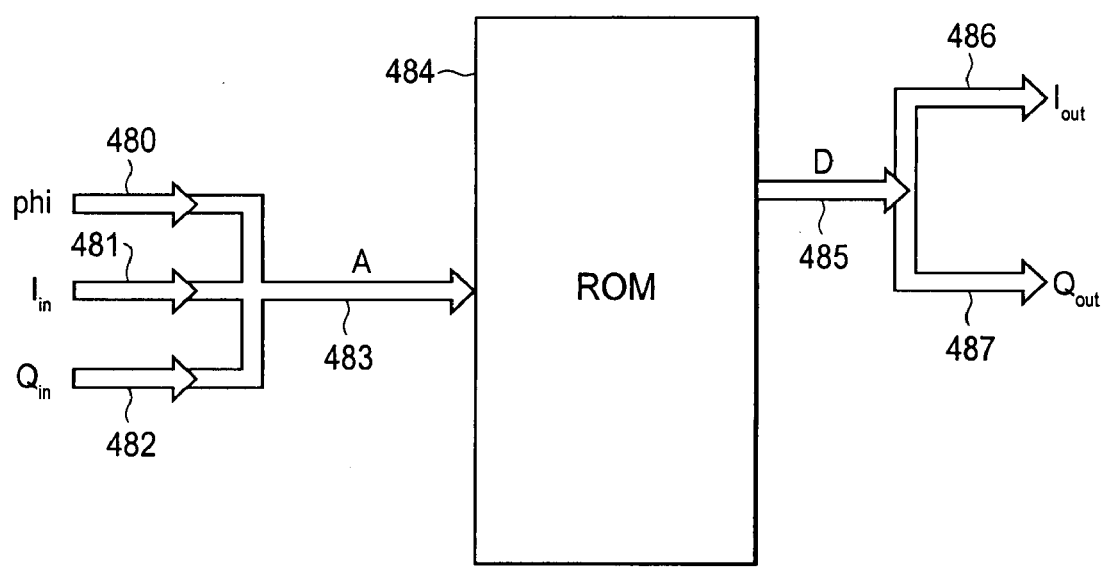
FIG. 5 shows details of an embodiment of phase shift circuits of FIG. 4.

FIG. 5 shows how phase shifters 417-419 (the connection of 417-419 to FIG. 5 is unclear) may be arranged in order to rotate its input vector represented by in phase component $I_{in}$ in the circuit (line?) 481 and quadrature-phase component $Q_{in}$ in the circuit 482 by the angle phi in the circuit (line?) 480. The circuits 480-482 may be merged into one combined circuit 483 that is applied as an address bus to a read-only memory (ROM) 484. The ROM 484 may store predefined values of shifted complex signal that appear in the data bus 485 in response to address A. Content of ROM 484 may be pre-calculated in such a way that one part of the data bus 485 delivers in-phase component $I_{out}$ of the phase-shifted signal in the circuit 486 while another part delivers its quadrature-phase component $Q_{out}$ in the circuit 487. In this manner, a desired complex output ($I_{out}$, $Q_{out}$) may be generated for each and every combination of input signals ($I_{in}$, $Q_{in}$) and phi.

To simplify the weighted sum block 425, equations (13), (14) may be correspondingly approximated by:

$$\bar{x}_i = x_i, \bar{y}_i = y_i, \bar{z}_i = z_i, \quad \text{if } 4x_i + 3y_i > \frac{0.69\sigma^2}{a_1} \quad (15)$$

$$\bar{x}_i = 0, \bar{y}_i = 0, \bar{z}_i = 0, \quad \text{if } |4x_i + 3y_i| \le \frac{0.69\sigma^2}{a_1}$$

$$\bar{x}_i = -x_i, \bar{y}_i = -y_i, \bar{z}_i = -z_i, \quad \text{if } 4x_i + 3y_i < \frac{0.69\sigma^2}{a_1}$$

and $$\bar{x}_i = x_i, \bar{y}_i = y_i, \bar{z}_i = z_i \quad \text{if } 4x_i > \frac{0.69\sigma^2}{a_1} \quad (16)$$

$$\bar{x}_i = 0, \bar{y}_i = 0, \bar{z}_i = 0 \quad \text{if } |4x_i| \le \frac{0.69\sigma^2}{a_1}$$

$$\bar{x}_i = -x_i, \bar{y}_i = -y_i, \bar{z}_i = -z_i \quad \text{if } 4x_i < \frac{0.69\sigma^2}{a_1}$$

and

Figures 6A, 6B:
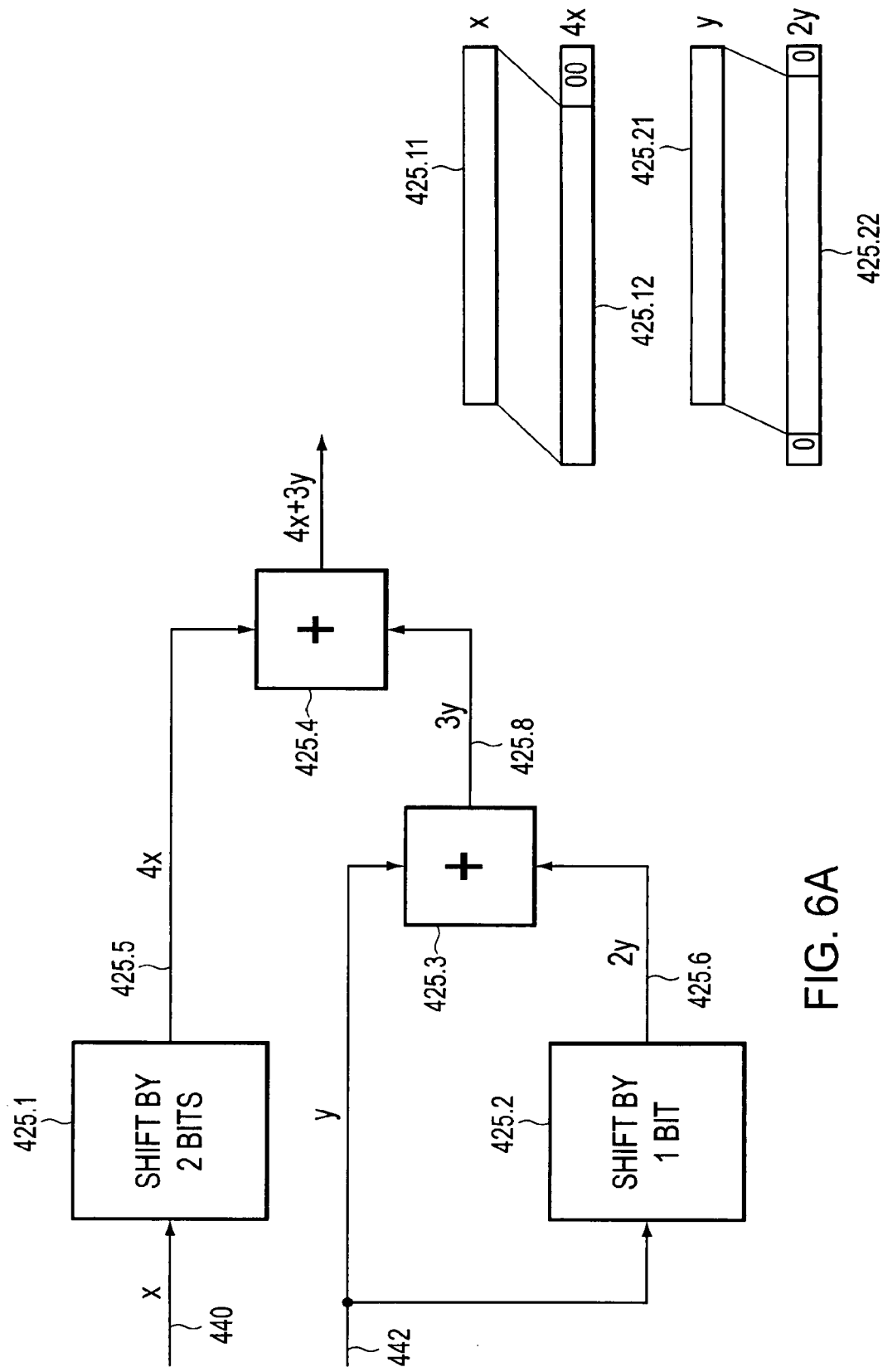
FIG. 6 shows details of an embodiment of a weighted sum circuit of FIG. 4.

Equations (15), (16) are based on an amplitude ratio $a_2/a_1=1/\text{sqrt}(2)\approx 0.707$ in accordance with "Interface Control Document ICD-GPS-200C", and the amplitude ratio $a_2/a_1$ is approximated by ¾ with accuracy of about 6%. FIG. 6 illustrates an embodiment of the weighted sum block 425. The input multi-bit x value 425.11 in the circuit 440 may be shifted by 2 bits to the left with zeroing the released LSB bits as indicated in FIG. 6(b). In this manner, the quadruplicate 4x value 425.12 may be delivered to the circuit 425.7. Similarly, the input multi-bit y value 425.21 in the circuit 442 may be shifted by 1 bit to the left with zeroing the released LSB bit and empty MSB bit as also indicated in FIG. 6(b). This way the doubled 2x value 425.22 may be delivered to the circuit 425.6. Then y and 2y values may be added in a summator 425.3 yielding the 3y signal in the circuit 425.8, which may be further added to the 4x value in another summator 425.4, yielding a desired 4x+3y signal in the circuitry or line 443. In this manner, a desired weighted sum may be obtained without complicated multiplication operations.

Figure 7:
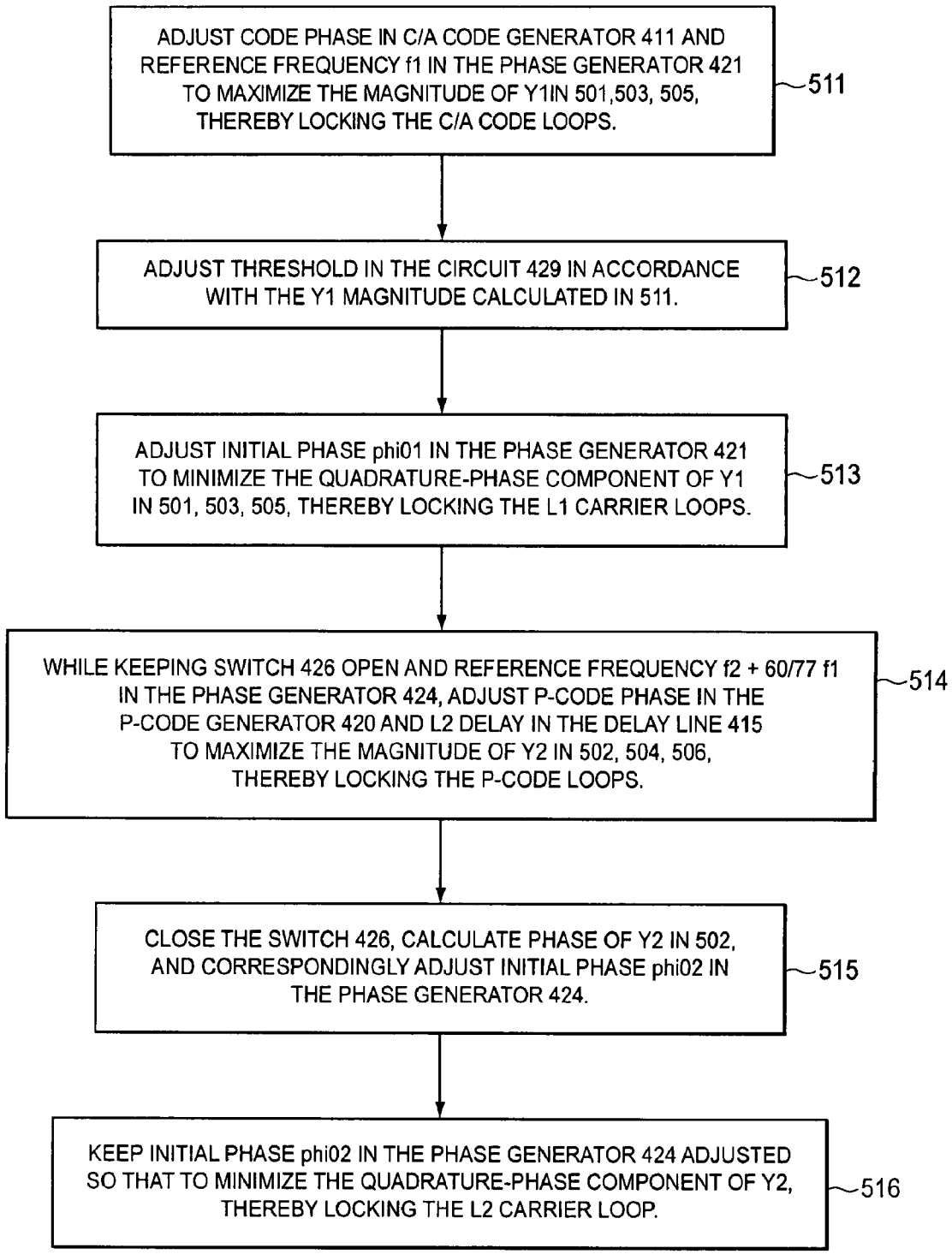
FIG. 7 illustrates process steps controlled by a central processing unit (CPU) according to embodiments of the present invention.

Referring to FIG. 7, a preferred technique is shown for adjusting and locking the carrier and code generators into phase with the carrier and code of the satellite signals being processed. In a first step 511, the CPU 50 may adjust C/A code phase in the C/A generator 411 and the replica's frequency in the phase generator 421 in each of processing channels 41-43 to maximize the magnitude of the vector Y1 in circuitry or lines represented by 501-505. Because all processing channels may be of identical structure, further description of FIG. 7 will be provided for only one channel 41.

When Y1 magnitude reaches maximum, the nominal C/A-code at the output of C/A generator 411 is in phase with the L1 signal being processed, and CPU 50 calculates L1 signal amplitude as $a_1=[Y1]$. Then, in a step 512, the CPU 50 may set the threshold in the circuit 429 to $0.69\sigma^2/a_1$) in accordance with equations (15), (16).

A next step 513 is for the CPU 50 to adjust the initial phase phi1 in circuit 435 and, correspondingly, the phase in circuit 434 in order to minimize absolute value of the quadrature-phase component of Y1 in the circuitry or line 501. When this occurs, the nominal L1 phase in circuit 434 is then known to be in phase with that of the L1 signal being processed. This provides an unambiguous reference for the L1 C/A carrier, and thus also for L1 P-code carrier that is shifted by ninety degrees from it. Then, a time difference of phi1 yields an accurate estimate of pseudo-Doppler frequency $f_1$ that is used in further steps.

In a step 514, the CPU 50 may begin estimating L2 signal parameters by setting a reference frequency $f_2=60/77\, f_1$ in the L2 phase generator 424, adjusting P-code phase in the P-code generator 420, and adjusting L2 delay in the controllable delay line 415 in order to maximize the magnitude of Y2 in the circuit 502. When this occurs, the P-code phase at the output of the P-code generator 420 is known to be in phase of that of L1 signal being processed, and the P-code phase at the output of the delay line 415 is known to be in phase of that of L2 signal being processed. At this moment, the phase of vector Y2 contains information about L2 pseudo-Doppler phase.

In a step 515, the CPU 50 may calculate L2 pseudo-Doppler phase by (12), and adjust correspondingly the initial phase phi02 in the phase generator 424. This provides the phi2 value in the circuit 436 that ensures compensation of the signal L2 pseudo-Doppler phase in the shifter 419. In turn, this compensation ensures that the angle θ in (11) is near zero, so it is expedient to use (15) instead of (16) in the process of generating Y2 value. Therefore, the CPU 50 may close the switch 426 to apply the in-phase component of the L2 signal in the circuit 442 to the input of the weighted summator 425.

In a step 516, CPU 50 adjusts the initial phase phi02 in the phase generator 424 in order to minimize absolute value of the quadrature-phase component of Y2 in the circuit 502. The phi02 value is in fact the desired L2 pseudo-Doppler phase.

It is noted that embodiments of the present invention may be applied the new L3-L5 signals. Additionally, the embodiments may be used in GPS, GNSS, or any other similar or compatible system.

According to embodiments of the present invention, a configuration file may simply be created for a new signal. The configuration file may be sent to an end user. The user can communicate the configuration file to the receiver's CPU which, in turn, may update PROM content correspondingly.

A receiver architecture according to embodiments of the present invention could have several configuration files in the receiver's PROM or these files that are interchangeably and dynamically reloaded into the programmable logic (e.g., FPGA) in order to adapt to different situations during operation of the receiver could be generated or modified as needed.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of deriving an amplitude and a pseudo-Doppler phase of an L2 signal from L1 and L2 signals received in a global positioning system, each of said L1 and L2 signals including a separate carrier frequency modulated by a known P-code and unknown W-code, the method comprising the steps of:
    amplifying and filtering L1 and L2 signals received from an antenna, and downconverting them to complex video frequency L1 and L2 signals;
    converting said complex video frequency L1 and L2 signals to a digital form;
    demodulating the digital complex video frequency L1 and L2 signals with a locally generated P-code replica to generate demodulated complex L1 and L2 signals;
    shifting a pseudo-Doppler phase of said demodulated complex L1 signal by a locally generated digital phase that changes from a first initial phase linearly in accordance with a first frequency to generate a demodulated Doppler-compensated L1 signal;
    shifting the pseudo-Doppler phase of said demodulated complex L2 signal by a locally generated digital phase that changes from a second initial phase linearly in accordance with a second frequency to generate a demodulated Doppler-compensated L2 signal;
    integrating said demodulated Doppler-compensated L1 and L2 signals over a first predefined time period to generate pre-integrated L1 and L2 signals;
    weighting an in-phase component of said pre-integrated L1 signal with a first weighting factor to generate a weighted in-phase L1 signal;
    weighting an in-phase component of said pre-integrated L2 signal with a second weighting factor to generate a weighted in-phase L2 signal;
    adding said weighted in-phase L1 signal to said weighted in-phase L2 signal to generate a total weighted in-phase signal;
    comparing a magnitude of said total weighted in-phase signal with a predefined threshold to generate an overshoot indicator;
    inverting said pre-integrated L2 signal by a sign of said total weighted in-phase signal to generate a decrypted L2 signal; and
    integrating said decrypted L2 signal over a second predefined time period on condition of said overshoot indicator to produce a complex integrated L2 signal the magnitude of which is proportional to a desired output amplitude of the L2 signal, and which phase, being added to said second initial phase, is equal to a desired output pseudo-Doppler phase of the L2 signal.

2. The method of claim 1, further comprising controlling said second weighting factor so that it is set to zero during time periods when no a priori estimate of the pseudo-Doppler phase of the L2 signal is available.

3. The method of claim 2, further comprising:
    demodulating the digital complex video frequency L1 signal with a locally generated C/A code replica to generate a second demodulated complex L1 signal;
    shifting said first initial phase by 90 degrees to generate a third initial phase;
    shifting a pseudo-Doppler phase of said second demodulated complex L1 signal by a locally generated digital phase that changes from said third initial phase linearly in accordance with said first frequency to generate a second demodulated Doppler-compensated L1 signal;
    integrating said second demodulated Doppler-compensated L1 signal over a third predefined time period to produce an integrated L1 signal;
    providing said integrated L1 signal to a feedback loop filter to generate an estimate of L1 pseudo-Doppler phase and an estimate of L1 pseudo-Doppler frequency; and
    adjusting said first initial phase in accordance with said estimate of L1 pseudo-Doppler phase and said estimate of L1 pseudo-Doppler frequency.

4. The method of claim 3, further comprising:
    subtracting said estimate of L1 pseudo-Doppler phase multiplied by a factor of 60/77 from a sum of said output pseudo-Doppler phase of the L2 signal and said second initial phase to generate a L1/L2 phase difference;
    smoothing said L1/L2 phase difference to generate a smoothed L1/L2 phase difference; and
    adjusting said second initial phase to be equal to a sum of said estimate of L1 pseudo-Doppler phase multiplied by a factor of 60/77 and said smoothed L1/L2 phase difference.

5. Receiver for accomplishing the method according to claim 4, in which the receiver contains the following for deriving the amplitude and pseudo-Doppler phase of signal L2 from signals L1 and L2 obtained in the global positioning system, each of said signals L1 and L2 having the separate carrier frequency modulated by a known P-code and unknown W-code:
    a radio frequency input unit, including means to amplify the received signals L1 and L2, a first frequency converter to convert said signal L1 to a first intermediate frequency, a second frequency converter to convert said signal L2 to a second intermediate frequency, a third frequency converter to convert said first intermediate frequency of signal L1 to the video frequency of complex signal L1 with in-phase and quadrature components L1, a fourth frequency converter to convert said second intermediate frequency of signal L2 to a video frequency of complex signal L2 with in-phase and quadrature components L2, means to filter said first and second intermediate frequencies and to filter the in-phase and quadrature components of said complex signals L1 and L2; a generator; a synchronization device connected to said generator and serving to form a global clock signal and to form heterodyne signals for any of the first to fourth frequency converters and means to convert said in-phase and quadrature components L1 and L2 to digital complex signals L1 and L2;

a group of digital processing channel processing said complex digital signals L1 and L2 connected to said synchronization device and producing output signals;

interface circuits to transmit said output signals from the digital processing channels to a programmable digital processor;

the programmable digital processor connected to said interface circuits to receive the output signals from the digital processing channels and to form data to control said data transmission of the digital processing channels and to determine a navigation solution;

a memory, connected to said programmable digital processor, used to store executable code for execution in the programmable digital processor, in which in each of said digital processing channels the following are contained:

a generator of a local copy of the P-code;

a delay device connected to said generator of the local copy of the P-code used to delay output of said generator of the local copy of the P-code by a value of the control delay, in which the delay device forms a delayed copy of the P-code;

a first inverter to invert the sign of the input digital complex signal L1 in response to said local copy of the P-code in order to obtain a complex signal L1 demodulated by the P-code;

a second inverter to invert the sign of the input digital complex signal L2 in response to said local copy of the P-code in order to obtain a complex signal L2 demodulated by the P-code;

a first phase generator to create a first phase variable that varies linearly with time according to the first initial phase and the first frequency;

a second phase generator to create a second phase variable, varying linearly with time according to the first initial phase and the second frequency;

a first phase-shifting circuit connected to the output of said first inverter and to the output of said first phase generator to shift the phase of said complex signal L1 demodulated by the P-code in response to the first phase variable;

a second phase-shifting circuit connected to the output of said second inverter and to the output of said second phase generator to shift the phase of said complex signal L2 demodulated by the P-code in response to the second phase variable;

a first integrator to integrate the output of said first phase shifting circuit over a time period approximately equal to the period of the unknown W-code, in which the output of the first integrator includes an integrated signal L1;

a second integrator to integrate the output of said second phase shifting circuit over a time period approximately equal to the period of the unknown W-code, in which the output of the second integrator includes an integrated signal L2;

a weighted summation device connected to an in-phase component of the output of said first integrator and an in-phase component of the output of said second integrator, said weighted summation device adding the in-phase component of the output of said first integrator, weighted by a first weight, and the in-phase component of the output of said second integrator, weighted by a second weight;

a threshold device connected to the output of said weighted summation device to create a sign indicator according to the sign of the output of said weighted summation device and create a threshold indicator according to the ratio between the predefined threshold and the output of said weighted summation device;

a third inverter connected to the output of said second integrator to invert the sign of the integrated signal L2 in response to said sign indicator; and a third integrator for conditional integration of the output of said third inverter during a first predetermined time period based on said threshold indicator to create a complex integrated output signal L2 suitable for further processing, to control said second initial phase and said second frequency and to obtain a navigation solution in said programmable digital processor.

6. Receiver according to claim 5, in which each of said digital processing channels additionally includes a device to block summing of the in-phase component from the output of said second integrator so that the output of said weighted summing device is equal to the output of said first integrator weighted by the first weight.

7. Receiver according to claim 6, in which each of said digital processing channels additionally includes:

a generator of the local copy of the C/A code;

a fourth inverter to invert the sign of the digital complex signal L1 in response to said local copy of the C/A code to create a complex signal L1 demodulated by the C/A code;

a third phase shifting circuit connected to the output of said fourth inverter and to the output of said first phase generator to shift the phase of said complex signal L1 demodulated by the C/A code in response to said first phase variable;

a fourth integrator to integrate the output of said fourth inverter during a second predetermined time period to create an inverted complex signal L1 suitable for further processing, to control said first initial phase and first frequency, and to transmit a navigation solution to said programmable digital processor.

8. Receiver according to claim 7, in which each of said phase shifting circuits contains a read-only memory (ROM) for storage of data, the read-only memory containing predefined phase-shifted complex values corresponding to combinations of possible phase values and possible values of said in-phase and quadrature components of said demodulated complex signals L1 and L2.

* * * * *